| United States Patent [19] | [11] Patent Number: 4,812,552 |
| Cliffton et al. | [45] Date of Patent: Mar. 14, 1989 |

[54] PROCESS FOR PREPARING POLY(ARYLENE SULFIDE KETONE) WITH WATER ADDITION

[75] Inventors: Michael D. Cliffton, Martinez, Ga.; Jon F. Geibel, Bartlesville, Okla.

[73] Assignee: Phillips Petroleum Company, Bartlesville, Okla.

[21] Appl. No.: 38,692

[22] Filed: Apr. 15, 1987

[51] Int. Cl.$^4$ ............................................. C08G 65/38
[52] U.S. Cl. ...................................... 528/226; 528/222
[58] Field of Search ................................ 528/226, 222

[56] References Cited

U.S. PATENT DOCUMENTS

| 3,876,591 | 4/1975 | Campbell | 260/79.1 |
| 4,232,142 | 11/1980 | Barr et al. | 528/125 |
| 4,361,693 | 11/1982 | Jansons | 528/86 |
| 4,415,729 | 6/1983 | Scoggins et al. | 528/388 |
| 4,418,029 | 11/1983 | Reed et al. | 264/211 |
| 4,525,579 | 6/1985 | Idel et al. | 528/226 |
| 4,698,415 | 10/1987 | Sinclair et al. | 528/226 |
| 4,716,212 | 12/1987 | Gaughan | 528/226 |

OTHER PUBLICATIONS

Chemical Abstracts (1982), 97:216826z and Indian Journal of Chemistry, D. Mukherjee et al (1982), 501–502.

*Primary Examiner*—Harold D. Anderson
*Attorney, Agent, or Firm*—Williams, Phillips & Umphlett

[57] ABSTRACT

A process and product produced therefrom for preparing a melt stable, high molecular weight poly(arylene sulfide ketone) from the addition of water to a reaction mixture containing a polyhalobenzophenone and an alkali metal sulfide. The water being present in a molar ratio of about 4.5:1 to about 8:1 with respect to the alkali metal sulfide.

19 Claims, 2 Drawing Sheets

PROCESS FOR PREPARING POLY(ARYLENE SULFIDE KETONE) WITH WATER ADDITION

FIELD OF THE INVENTION

The invention relates to a method for preparing poly(arylene sulfide ketone)s. This invention also relates to melt stable high molecular weight poly(arylene sulfide ketone)s. The invention in another aspect relates to fibers and other articles of manufacture prepared from these poly(arylene sulfide ketone)s.

BACKGROUND OF THE INVENTION

Poly(arylene sulfide ketone)s, PASK, are useful engineering thermoplastics for film, fiber, molding, and composite applications because of their high melting points. One process for producing poly(arylene sulfide ketone)s involves the reaction of a polyhalobenzophenone such as dichlorobenzophenone with an alkali metal sulfide in a polar organic solvent. The alkali metal sulfide can be added as such or can be prepared from the reaction of an alkali metal hydrosulfide with an alkali metal hydroxide using an equal molar amount of the alkali metal hydrosulfide with respect to the alkali metal hydroxide. However, a major disadvantage is that the poly(arylene sulfide ketone)s so produced are of low molecular weight and low melt stability.

Poly(arylene sulfide ketone)s of high molecular weight are desirable because they possess good mechanical properties. If an excess amount of alkali metal hydrosulfide is present during the polymerization reaction, poly(arylene sulfide ketone)s of high molecular weight can be produced. This means that a molar excess of alkali metal hydrosulfide with respect to the alkali metal hydroxide is present when the alkali metal sulfide is prepared, or that some alkali metal hydrosulfide is added with the alkali metal sulfide.

In addition to high molecular weight, processability is another desirable property that poly(arylene sulfide ketone)s should possess. Processability means that a polymer is able to be processed by conventional means and, therefore, can be commercially useful. The processability of a polymer depends upon the polymer's melt stability. This means that if a polymer is melt stable it will generally also be processable. Poly(arylene sulfide ketone)s produced by prior methods are not very melt stable and, therefore, are not processable. Even high molecular weight poly(arylene sulfide ketone)s produced with excess alkali metal hydrosulfide are not very melt stable.

It would be most desirable to be able to produce melt stable poly(arylene sulfide ketone)s having a high molecular weight It is an object of our invention to provide a process for preparing high molecular weight poly(arylene sulfide ketone)s. It is a further object of our invention to provide a process for preparing melt stable poly(arylene sulfide ketone)s. It is a further object of our invention to prepare novel melt stable poly(arylene sulfide ketone)s. It is yet a further object of our invention to prepare novel melt stable, high molecular weight poly(arylene sulfide ketone)s.

SUMMARY OF THE INVENTION

We have discovered that novel melt stable, high molecular weight poly(arylene sulfide ketone)s are prepared by contacting in a reaction mixture a polyhalobenzophenone, an alkali metal hydrosulfide, an alkali metal hydroxide, a polar organic compound, and water, where the amount of water employed is the amount sufficient to improve the melt stability of the polymer but yet not sufficient to cause a molecular weight limiting phase separation. Generally the molar ratio of water to alkali metal hydrosulfide is within the range of about 3.5:1 to about 7:1.

The polymers prepared according to the present invention are novel since prior to the present invention melt stable poly(arylene sulfide ketone)s were unknown.

Figure 1:
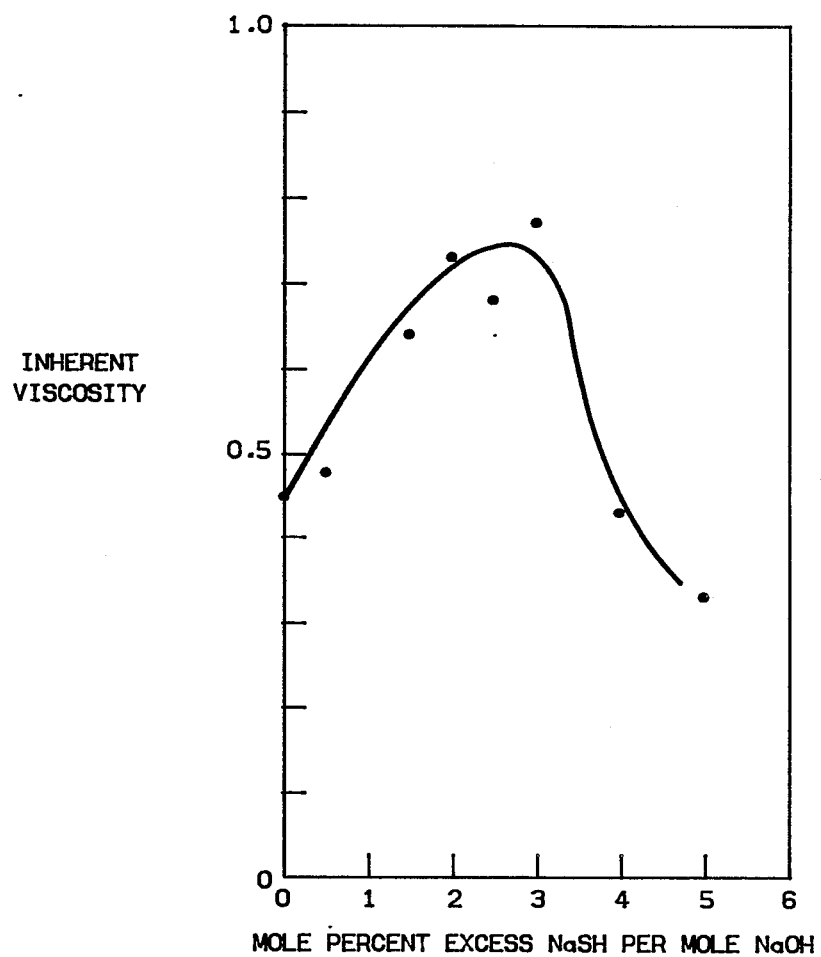
FIG. 1 is a curve plotting the inherent viscosity of PASK prepared at various mole percent excess NaSH per mole NaOH. The curve demonstrates the effect of excess sodium hydrosulfide, in the reaction mixture, on the inherent viscosity of the resulting poly(arylene sulfide ketone)s (data in Table II).
Figure 2:
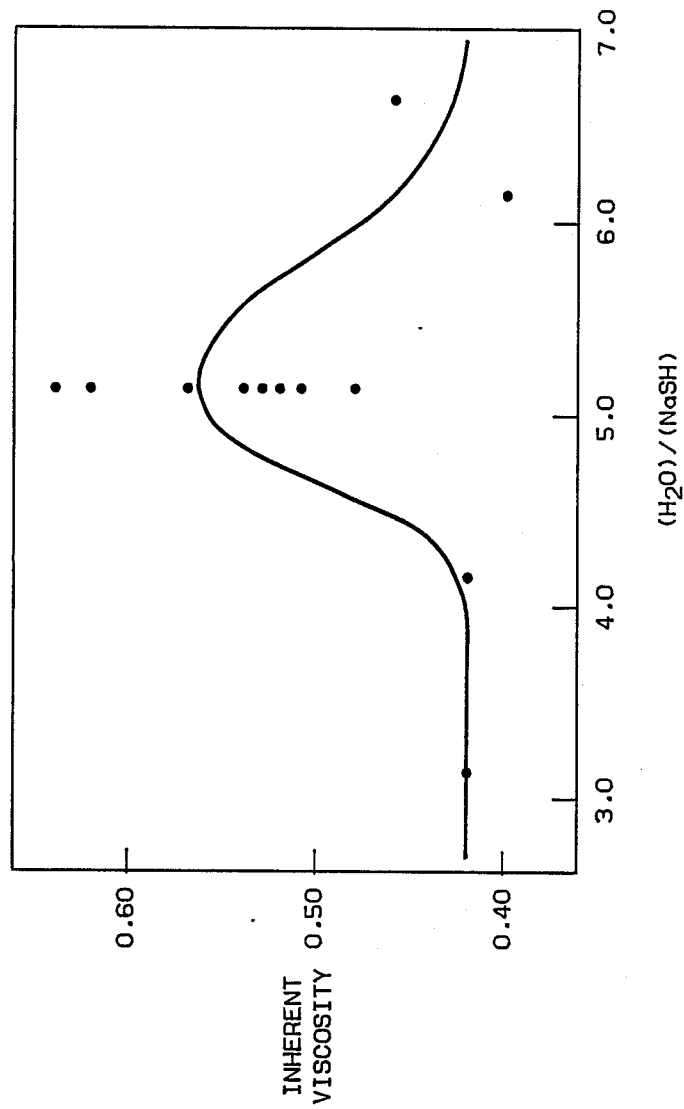
FIG. 2 is a curve resulting from plotting the inherent viscosity of PASK prepared at various $(H_2O)/(NaSH)$ ratios. The curve demonstrates the effect of excess $H_2O$, in the reaction mixture, on the inherent viscosity of the resulting poly(arylene sulfide ketone)s (data in Table I).

These two figures demonstrate that both sodium hydrosulfide and water have an independent optimum amount that should be added to a polymerization mixture to increase the inherent viscosity (indicative of molecular weight) of the resulting polymers. While these figures do not reflect the melt stability of the resulting polymers, the polymers synthesized with excess $H_2O$ are quite a bit more melt stable than the polymers synthesized with excess sodium hydrosulfide. This is particularly true for polymers with an inherent viscosity of about 0.6 dl/g.

DETAILED DESCRIPTION OF THE INVENTION

In accordance with our invention, poly(arylene sulfide ketone)s are prepared by contacting in a reaction mixture a polyhalobenzophenone, an alkali metal sulfide, a polar organic compound, and water, under polymerization conditions effective for producing the poly(arylene sulfide ketone)s. According to one process of our invention, the alkali metal sulfide is prepared by bringing together an alkali metal hydrosulfide with an alkali metal hydroxide at a molar ratio within the range of about 0.95:1. The water with respect to the alkali metal hydrosulfide is present in the amount sufficient to improve the melt stability of the polymer but yet not sufficient to cause a molecular weight limiting phase separation. Generally such effective amount is a molar ratio within the range of about 3.5:1 to about 7:1 water:alkali metal hydrosulfide.

The use of these ratios of alkali metal hydrosulfide, alkali metal hydroxide, and water in the process for preparing the poly(arylene sulfide ketone)s produce melt stable, high molecular weight poly(arylene sulfide ketone)s.

Poly(arylene sulfide ketone)s produced according to this invention also exhibit improvements in at least one or more of the following flexibility, strength, toughness, decreased outgassing, and a more homogeneous appearance when compared to poly(arylene sulfide ketone)s produced from methods not employing the ratios of these compounds in the reaction mixtures.

Poly(arylene sulfide ketone)s produced according to the present invention also exhibit an improvement in color (particularly after processing) which is a property that seems to be unrelated to molecular weight and melt stability.

The reaction of a dihalobenzophenone, such as 4,4'-dichlorobenzophenone, with an alkali metal sulfide prepared from an alkali metal hydrosulfide, such as sodium hydrosulfide, and an alkali metal hydroxide, such as sodium hydroxide, and water, in a polar organic compound, such as N-methyl-2-pyrrolidone, so as to form a poly(phenylene sulfide ketone) of "n" repeating units of phenylene sulfide ketone can be represented by the following formula:

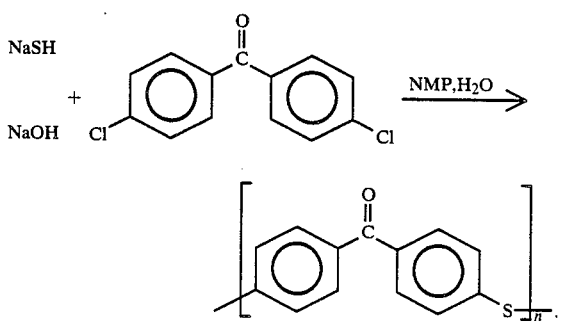

In one process of our invention, in which the alkali metal sulfide is prepared by bringing together an alkali metal hydrosulfide with an alkali metal hydroxide, the molar ratio of alkali metal hydrosulfide to alkali metal hydroxide can vary somewhat, it is important, however, that the molar ratio be about 1:1. Generally the molar ratio of alkali metal hydrosulfide to alkali metal hydroxide will be within the range of about 0.95:1 to about 1.05:1, preferably in the range of about 1:1 to about 1.01:1. It is more preferred that the alkali metal hydrosulfide be present in slight molar excess to the alkali metal hydroxide, most preferably about 1.005:1.

When the alkali metal sulfide is prepared from alkali metal hydrosulfide and alkali metal hydroxide one mole of water is produced for each mole of alkali metal sulfide produced. This means that when the alkali metal sulfide is prepared by this method some water, in addition to the added water, is already present. The water produced in this reaction is not included in the calculation of ratios since the amount of water is calculated with respect to alkali metal hydrosulfide prior to making alkali metal sulfide and water. If the ratios were to be reported as water with respect to alkali metal sulfide, one mole would need to be added to the water side of the ratio.

In our invention, it is essential that during polymerization a molar excess (stoichiometric excess) of water be present with respect to the alkali metal hydrosulfide. This means that more water is present than just the one mole of water produced in making the one mole of alkali metal sulfide from alkali metal hydrosulfide and alkali metal hydroxide. Although the molar excess of water to alkali metal hydrosulfide can vary somewhat, generally the molar ratio of water to alkali metal hydrosulfide (prior to making alkali metal sulfide and water) will be within the range of about 3.5:1 to about 7:1, preferably about 4.5:1 to about 6:1, more preferably about 4.7:1 to about 5.7:1. It is more preferred that the molar ratio of water to the alkali metal hydrosulfide be about 5:1, with 5.13:1 being preferred. It is important, however, that too much water not be present during polymerization or there could be a phase separation which would separate reactants, thereby slowing the polymerization and limiting the molecular weight of the polymer.

According to our invention, in addition to using excess water, it is also preferred, but not necessary, that an excess of alkali metal hydrosulfide to alkali metal hydroxide be present in the reaction mixture. It is, however, important in our invention that the molar ratio of alkali metal hydrosulfide to alkali metal hydroxide be within the range of about 0.95:1 to about 1.05:1 when the alkali metal sulfide is prepared from these two reactants.

It is also preferred that the polymers produced in the presence of excess water, according to our invention, be further treated with calcium to incorporate calcium cations into the polymer. This treatment with calcium further melt stabilizes the polymers rendering them even more processable. Any process whereby calcium cations contact the polymer is envisioned to be within this preferred further treatment; such as melt mixing a calcium compound with the polymer or treating the polymer with an aqueous solution of a calcium compound.

It is important in our invention that the polymers be processable. This means that the poly(arylene sulfide ketone)s, (PASK) produced according to the present invention must be melt stable. A melt stable PASK can have any molecular weight desired depending upon the properties of the final product. It is preferred, however, that the polymers of the present invention be high molecular weight PASK. The polymer molecular weight is indicated by its inherent viscosity. High inherent viscosity indicates that a polymer has a high molecular weight. The inherent viscosity is determined according to ASTM D 2857 at 30° C. in concentrated sulfuric acid.

The poly(arylene sulfide ketone)s prepared according to our process will have a high molecular weight, as indicated by the inherent viscosity. These poly(arylene sulfide ketone)s will generally be expected to have an inherent viscosity of at least about 0.3, preferably at least about 0.4, most preferably about 0.5 to 1, deciliters per gram (dl/g).

Melt flow is an additional measure of the molecular weight of the polymer. Melt flow, as used herein, can also indicate the melt stability of a polymer by noting the change in melt flow between melt flow measurements taken at different times. Melt stable means that the melt flow of the polymer does not change significantly over the time between one melt flow measurement to the next melt flow measurement.

Poly(arylene sulfide ketone)s prepared according to the method of the present invention are of present interest for film, fiber, molding, and composite applications because of their high melting points, high molecular weight, and melt stability.

Our process employs a polyhalobenzophenone. Our process preferably employs a dihalobenzophenone. Our process more preferably employs a dihalobenzophenone of the formula:

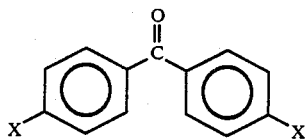

wherein X is selected from the group consisting of a chlorine, bromine, fluorine, and iodine.

Examples of polyhalobenzophenones which can be employed in the process of our invention include 4,4'-dichlorobenzophenone, 4,4'-difluorobenzophenone, 2,4,4'-trichlorobenzophenone, 2,4,4'-trifluorobenzophenone, 2,4,4'-tribromobenzophenone, 2,4,4'-triiodobenzophenone, 4,4'-dibromobenzophenone, 4,4'-diiodobenzophenone, 2,4'-dichlorobenzophenone, and the like, and mixtures of any two or more thereof. The presently preferred polyhalobenzophenone, due to its effectiveness and commercial availability, is 4,4'-dichlorobenzophenone.

In our invention, the amount of polyhalobenzophenone employed depends upon the amount of alkali metal sulfide employed (prepared in-situ or added) but generally they will both be present in about equal molar amounts. The preferred molar ratio of polyhalobenzophenone to alkali metal sulfide is within the range of about 0.95:1 to about 1.05:1.

At the end of the polymerization process, the polymer can be endcapped by cooling down the reactor contents and adding an endcapping monomer such as 4,4'-dichlorobenzophenone (DCBP) or 4-chlorobenzophenone (CBP). The endcapping of the polymer does not alter the melt stability of the polymer, so it is not essential, according to the present invention, to endcap the polymer.

The alkali metal sulfides can be prepared by reacting about 1 mole hydrogen sulfide with about 2 moles of an alkali metal hydroxide. The alkali metal sulfides can also be prepared from the reaction product of an alkali metal hydrosulfide with an alkali metal hydroxide in an aqueous solution. The alkali metal hydrosulfides include lithium hydrosulfide, sodium hydrosulfide, potassium hydrosulfide, rubidium hydrosulfide, cesium hydrosulfide, and mixtures thereof. The alkali metal hydroxides include lithium hydroxide, sodium hydroxide, potassium hydroxide, rubidium hydroxide, cesium hydroxide, and mixtures thereof. The preferred alkali metal hydrosulfide, due to its effectiveness, is sodium hydrosulfide (NaSH). The preferred alkali metal hydroxide, due to its effectiveness, is sodium hydroxide (NaOH). Thus, the preferred alkali metal sulfide that is produced is sodium sulfide ($Na_2S$).

The polar organic compounds which can be used with polyhalobenzophenone and alkali metal sulfide in the production of poly(arylene sulfide ketone)s include amides and sulfones. Examples include hexamethyl phosphoramide, tetramethylurea, N,N'-ethylenedipyrrolidone, 1,3-dimethyl-2-imidazolidinone, N-methyl-2-pyrrolidone (NMP), pyrrolidone, caprolactam, N-ethylcaprolactam, sulfolane, N,N'-dimethylacetamide, diphenylsulfone, and the like, and mixtures thereof. The preferred polar organic compound, due to its effectiveness and commercial availability, is NMP.

The molar ratio of polar organic compound used in our invention is generally about 4:1 to 24:1, preferably about 12:1, with respect to the amount of alkali metal sulfide in the reaction mixture.

The order of addition of the ingredients used to prepare the poly(arylene sulfide ketone)s can be varied as desired. Generally the alkali metal hydrosulfide, such as NaSH, the alkali metal hydroxide, such as NaOH, the dihalobenzophenone, such as 4,4'-dichlorobenzophenone, and water can be added to a reactor vessel in any order. The polar organic solvent, such as NMP, will generally be added to the reaction mixture following the addition of the aforementioned ingredients to the reaction vessel.

Although the reaction temperature at which the polymerization is conducted can vary over a wide range, generally it will be within the range of about 125° C. to about 450° C., preferably about 175° C. to about 350° C., most preferably about 225° C. to about 275° C. The reaction time can vary widely, depending in part on the reaction temperatures, but generally will be within the range of about 10 minutes to about 72 hours, preferably about 1 hour to about 20 hours. The pressure should be sufficient to maintain the reaction mixture substantially in the liquid phase. The pressure will generally be in the range of about 0 psig to about 400 psig, preferably about 150 psig to about 250 psig.

The polymer can be recovered as desired, preferably by removing the polymerization solvent and precipitated products of polymerization from a cooled reactor and recovering the polymer by filtering through a filtration apparatus. The polymer will subsequently be washed with water and dried in a vacuum oven.

The melt stability of the polymer treated according to our invention can be assessed by noting its changes in the rate of melt flow with time after being retained in a barrel of a melt index apparatus, based on ASTM test method D1238, for a time ranging from about five minutes to about thirty minutes at 371° C. (700° F.). The standard test conditions of ASTM D 1238 as used herein are modified by increasing the operating temperature to 371° C. which is above the melting point of poly(arylene sulfide ketone) resins. Melt flow at arbitrarily selected times is determined by adding a five kilogram (kg) weight to the piston in the barrel of the melt index apparatus and weighing the cooled extrudate. If little or no change occurs in the amount of polymer extruded from the barrel during the five minutes to thirty minutes, then it is apparent that a relatively stable melt flow product is being tested. Generally, a melt flow decrease occurs, indicated by a longer extrusion time required to extrude a predetermined amount of polymer from the barrel. However, in some instances a melt flow increase occurs, indicated by a shorter time required to extrude a predetermined amount of polymer from the barrel. For the purpose of this invention a change in the rate of polymer extrusion (melt flow) of more than about ±50 percent, comparing the 10 minute melt flow to the five minute melt flow, is arbitrarily deemed to be not acceptable (the polymer is not melt stable).

EXAMPLES

Examples provided are intended to assist in a further understanding of our invention. Particular materials, species, and conditions employed are intended to be further illustrative of our invention and not limitative of the reasonable scope thereof.

EXAMPLE I

In this example the preparation of control PASK poly(phenylene sulfide ketone)s (PPSK) are described.

To a two gallon stainless steel reactor, fitted with an anchor stirrer and nitrogen inlet tube, were charged: 2.01 moles of sodium hydrogen sulfide (NaSH) in aqueous solution (191.8 grams of 58.75 weight percent NaSH in water), 2.00 moles of sodium hydroxide (80 grams of NaOH pellets, provided by Mallincrodt, Inc., St. Louis, Mo.), 2.00 moles of 4,4'-dichlorobenzophenone (502 grams of DCBP; provided by Ihara Chemical Company) and 24.84 moles of N-methyl-2-pyrrolidone (2400 cc NMP; provided by BASF).

The reactor was sealed and flushed several times with 100 psig $N_2$ and then vented to remove air while the reaction mixture was stirred at room temperature. The reactor mixture was then heated to a temperature of about 250° C. This temperature was maintained for about 4 hours, while a pressure of about 180 psig was established. The reactor was then cooled to about 200° C., and 0.025 moles (6.27 grams) of 4,4'-dichlorobenzophenone (DCBP) were charged to the reactor. 700 cc of N-methyl-2-pyrrolidone were further charged to the reactor for end capping the formed PPSK with DCBP. The system was heated an additional hour at 250° C., and cooled overnight to room temperature. Following filtration, the polymer was given 6 hot water washes and dried in a forced air oven to about 110° C. for about 6 hours. PPSK prepared from this procedure exhibited fair melt stability (gelled after five minutes on a hot bar at 371° C. (700° F.) with a minimum of gassing), and had a relatively low molecular weight (inherent viscosity of 0.42 dl/g). The molar ratio of $H_2O$ to NaSH was 2.2:1 (Run 1).

EXAMPLE II

This example describes the preparation of PPSK employing a ratio of NaSH to NaOH of about 1.005:1, essentially in accordance with Example I. This example further illustrates the preparation of PPSK by adding about 5.2 moles of water per mole NaSH to the reaction mixture so as to increase inherent viscosity and improve melt stability of the formed polymer, essentially in accordance with Example I. The excess water will be added to the reactor vessel in conjunction with the NaOH; NaSH and DCBP. The order of water addition is not critical in the preparation of the polymer.

Results are summarized in Table I.

TABLE I

| Run | Reactor Charge Molar Ratio NaSH:NAOH:DCBP:Added H$_2$O:NMP | Molar Ratio of H$_2$O to NaSH in Reactor Mixture$^{(a)}$ | Inh. Visc. (dl/g) | Melt Stab. |
|---|---|---|---|---|
| 1 | 1.005:1:1:0:12 | 2.14:1 | 0.42 | fair |
| 2 | 1.005:1:1:1:12 | 3.14:1 | 0.42 | fair |
| 3 | 1.005:1:1:2:12 | 4.14:1 | 0.42 | fair |
| 4 | 1.005:1:1:2:12 | 4.14:1 | 0.74$^{(b)}$ | poor |
| 5 | 1.005:1:1:2:12 | 4.14:1 | 0.43 | fair |
| 6 | 1.005:1:1:3:12 | 5.13:1 | 0.54 | good |
| 7 | 1.005:1:1:3:12 | 5.13:1 | 0.48 | good |
| 8 | 1.005:1:1:3:12 | 5.13:1 | 0.57 | good |
| 9 | 1.005:1:1:3:12 | 5.13:1 | 0.52 | good |
| 10 | 1.005:1:1:3:12 | 5.13:1 | 0.62 | good |
| 11 | 1.005:1:1:3:12 | 5.13:1 | 0.64 | good |
| 12 | 1.005:1:1:3:12 | 5.13:1 | 0.53 | good |
| 13 | 1.005:1:1:3:12 | 5.13:1 | 0.52 | good |
| 14 | 1.005:1:1:3:12 | 5.13:1 | 0.51 | good |
| 15 | 1.005:1:1:4:12 | 6.13:1 | 0.40 | fair |
| 16 | 1.005:1:1:4.5:12 | 6.63:1 | 0.46 | fair |

$^{(a)}$Includes about 2.13–2.14 moles of water added in each run with the NaSH feedstock but does not include the water produced from the reaction of NaSH + NaOH → Na$_2$S + H$_2$O.
$^{(b)}$Anomalously high; possible weighing error in the amount of NaSH since the polymer cured too fast.

In Table I, the important variable is the amount of water present during polymerization. Runs 6 through 14 are at the preferred ratio of water to NaSH. These runs indicate that the polymers produced at this ratio are more melt stable and have higher molecular weights than the polymers produced at a less preferred ratio of water to NaSH. These runs also demonstrate that when a small molar excess of NaSH to NaOH is employed in conjunction with an optimum molar ratio of water to NaSH, the resultant product exhibit a high inherent viscosity and good melt stability, when compared to a poly(arylene sulfide ketone) produced from a method not employing the addition of water in the reaction mixture. The addition of the amount of water of the present invention to the process for preparing the poly(arylene sulfide ketone)s produces melt stable, high molecular weight poly(arylene sulfide ketone)s.

Poly(arylene sulfide ketone)s of the present invention also exhibit improvement in at least one or more of the following: flexibility, strength, toughness, color, decreased outgassing, and a homogeneous appearance when compared to poly(arylene sulfide ketone)s produced from a method not employing the additional amount of the present invention water in the reaction mixture. In other words, the result above indicates that polymers produced according to the present invention have improved properties and can be processed.

EXAMPLE III

In this example the preparation of PPSK is essentially in accordance with Example I except that the ratio of NaSH to NaOH is varied to show the effect of this ratio on molecular weight (inherent viscosity). Unless otherwise noted, these reactions were run using a double helical stirrer and an equimolar ratio of DCBP to NaOH and NaSH, and heated to 250° C., held ≃250° C. for 3 hours and "end capped" with 3 g of DCBP.

TABLE II

| PPSK Made With Sodium Sulfide Flake | | |
|---|---|---|
| Run | Inherent Viscosity | Mole % Excess NaSH |
| 1 | 0.45 | 0 |
| 2 | 0.45 | 0 |
| 3 | 0.49 | 0.5 |
| 4 | 0.64 | 1.5 |
| 5 | 0.64 | 1.5 |
| 6 | 0.58$^{(a)}$ | 1.5 |
| 7 | 0.73 | 2.0 |
| 8 | 0.68 | 2.5 |
| 9 | 0.77 | 3.0 |
| 10 | 0.77$^{(b)}$ | 3.0 |
| 11 | 0.77$^{(c)}$ | 3.0 |

TABLE II-continued

PPSK Made With Sodium Sulfide Flake

| Run | Inherent Viscosity | Mole % Excess NaSH |
|---|---|---|
| 12 | 0.45[d] | 4.0 |
| 13 | 0.33[d] | 5.0 |
| 14 | 0.37[e] | 6.0 |

[a] anchor stirrer
[b] "end capped" with 5 g DCBP
[c] "end capped" with 2.2 g benzophenone
[d] "end capped" with 6 g DCBP
[e] "end capped" with 9 g DCBP The results in Table II demonstrate the effect of excess sodium hydrosulfide, in the reaction mixture, on the inherent viscosity of the resulting poly(arylene sulfide ketone)s. The inherent viscosity increases with excess sodium hydrosulfide up to about 3% excess then drops off to be equal to no excess at about 4% excess.

These Examples II and III demonstrate that both sodium hydrosulfide and water have an independent optimum amount that should be added to a polymerization mixture to increase the inherent viscosity (indicative of molecular weight) of the resulting polymers. However, the polymers synthesized with excess $H_2O$ are quite a bit more melt stable than the polymers synthesized with excess sodium hydrosulfide. This is particularly true for polymers with an inherent viscosity of about 0.6 dl/g.

That which is claimed is:

1. A method for preparing a poly(arylene sulfide ketone) comprising:
   contacting a polar organic compound, a polyhalobenzophenone, an alkali metal sulfide, and water, employing a molar excess of water with respect to the alkali metal sulfide sufficient to improve the melt stability of the resulting poly(arylene sulfide ketone) but yet not sufficient to cause a molecular weight limiting phase separation, and employing a molar ratio of polyhalobenzophenone to alkali metal sulfide of about 0.95:1 to about 1.05:1, under polymerization conditions effective for producing the poly(arylene sulfide ketone) of improved melt stability.

2. The method of claim 1, wherein said polyhalobenzophenone is a dihalobenzophenone of the formula:

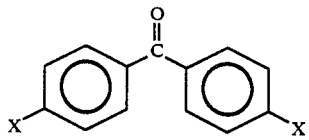

wherein X is selected from the group consisting of a chlorine, bromine, fluorine, and iodine.

3. The method of claim 1, wherein the alkali metal sulfide is prepared from alkali metal hydrosulfide and alkali metal hydroxide, the molar excess of water to the alkali metal hydrosulfide in the reaction mixture is within the molar ratio range of about 4.5:1 to about 6:1, and the molar ratio of alkali metal hydrosulfide to alkali metal hydroxide in the reaction mixture is within the range of about 0.95:1 to about 1.05:1.

4. The method of claim 1, wherein the polyhalobenzophenone comprises a dihalobenzophenone, the alkali metal sulfide is prepared from an alkali metal hydrosulfide and an alkali metal hydroxide employing a molar ratio of about 1:1, and the molar excess of water with respect to the alkali metal hydrosulfide is within the molar ratio range of about 3.5:1 to about 7:1.

5. The method of claim 4, wherein the poly(arylene sulfide ketone) comprises poly(phenylene sulfide ketone) and the molar ratio of alkali metal hydrosulfide to alkali metal hydroxide in the reaction mixture is within the range of about 0.95:1 to about 1.05:1.

6. The method of claim 4, wherein the alkali metal hydrosulfide comprises sodium hydrosulfide, the alkali metal hydroxide comprises sodium hydroxide, the dihalobenzophenone comprises 4,4'-dichlorobenzophenone, and the polar organic compound comprises N-methyl-2-pyrrolidone.

7. The method of claim 6, wherein the molar ratio of sodium hydrosulfide to sodium hydroxide is within the range of about 1:1 to about 1.01:1.

8. The method of claim 7, wherein the molar ratio of sodium hydrosulfide to sodium hydroxide is about 1.005:1.

9. The method of claim 6, wherein the molar ratio of sodium hydrosulfide to sodium hydroxide in the reaction mixture is within the range of about 0.95:1 to about 1.05:1 and the molar ratio of water to sodium hydrosulfide in the reaction mixture is within the range of about 4.5:1 to about 6:1.

10. The method of claim 9, wherein the molar ratio of sodium hydrosulfide to sodium hydroxide in the reaction mixture is within the range of about 1:1 to about 1.01:1 and the molar ratio of water to sodium hydrosulfide in the reaction mixture is within the range of about 4.7:1 to about 5.7:1.

11. The method of claim 10 wherein the molar ratio of sodium hydrosulfide to sodium hydroxide in the reaction mixture is about 1.005:1 and the molar ratio of water to sodium hydrosulfide in the reaction mixture is about 5:1.

12. The process according to claim 1 wherein the poly(arylene sulfide ketone) is contacted with calcium cations.

13. A poly(arylene sulfide ketone) produced according to the process of claim 1 wherein the melt flow of said poly(arylene sulfide ketone) at about 700° F. changes less than ±50 percent, comparing the 10 minute melt flow to the 5 minute melt flow.

14. A composition comprising melt stable poly(arylene sulfide ketone) produced according to the process of claim 1 wherein the melt flow of said poly(arylene sulfide ketone) at about 700° F. changes less than ±50 percent, comparing the 10 minute melt flow to the 5 minute melt flow.

15. The composition of claim 14 wherein said melt stable poly(arylene sulfide ketone) comprises melt stable high molecular weight poly(arylene sulfide ketone).

16. The composition of claim 14 wherein said melt stable poly(arylene sulfide ketone) comprises melt stable poly(phenylene sulfide ketone).

17. An article of manufacture produced from melt stable poly(arylene sulfide ketone) produced according to the process of claim 1 wherein the melt flow of said poly(arylene sulfide ketone) at about 700° F. changes less than ±50 percent, comparing the 10 minute melt flow to the 5 minute flow.

18. The article of manufacture of claim 17 wherein said melt stable poly(arylene sulfide ketone) comprises melt stable high molecular weight poly(arylene sulfide ketone).

19. The article of manufacture of claim 18, wherein said article produced from said poly(arylene sulfide ketone) is selected from the group consisting of fiber and film.

* * * * *